June 10, 1930.  J. I. HAASE  1,763,583
CONTROL DEVICE FOR SHEET FEEDING MECHANISMS
Filed March 23, 1928    2 Sheets-Sheet 1
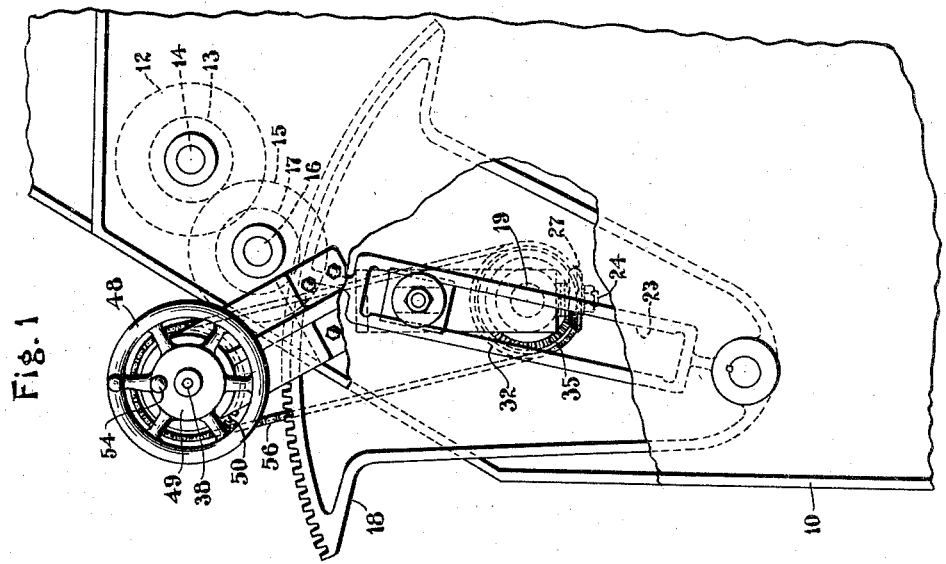
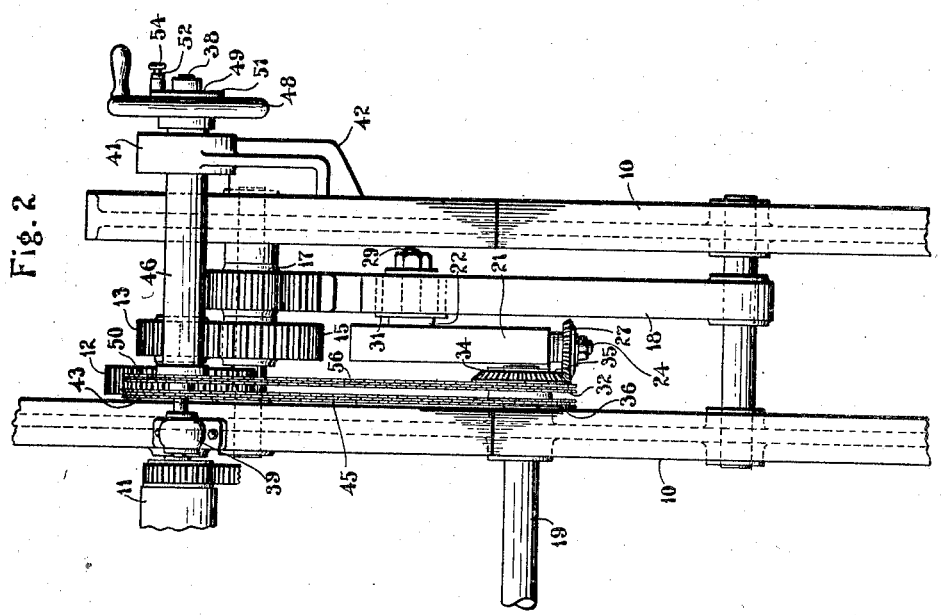
Inventor
Jorgen I. Haase
By
Attorney

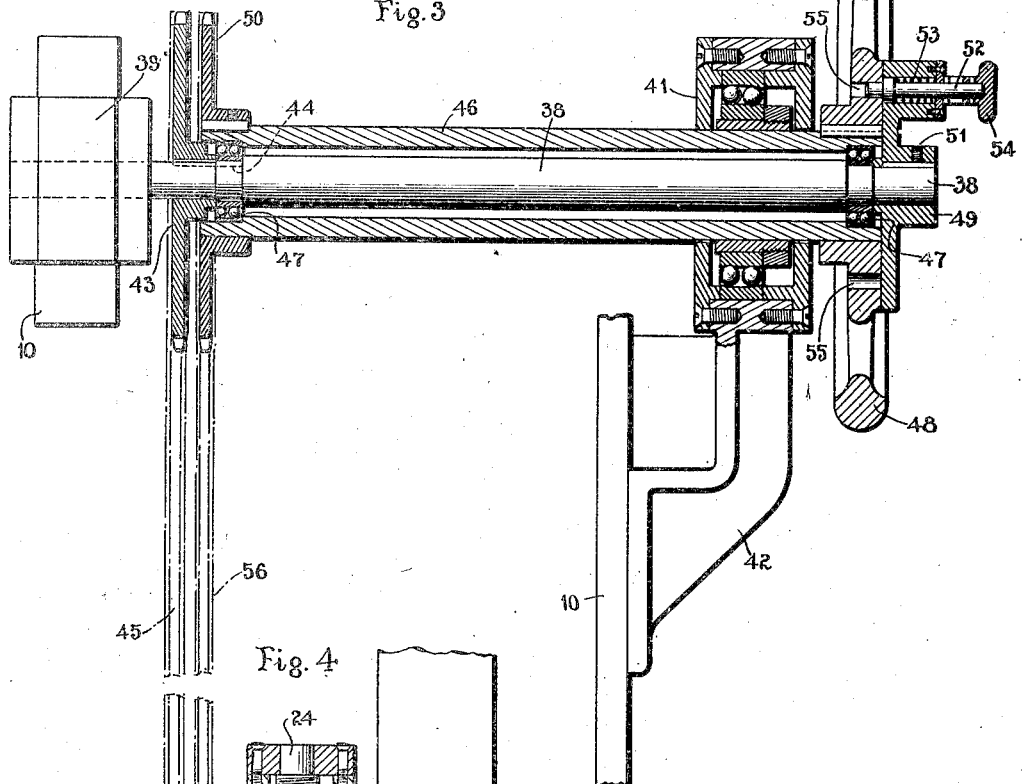
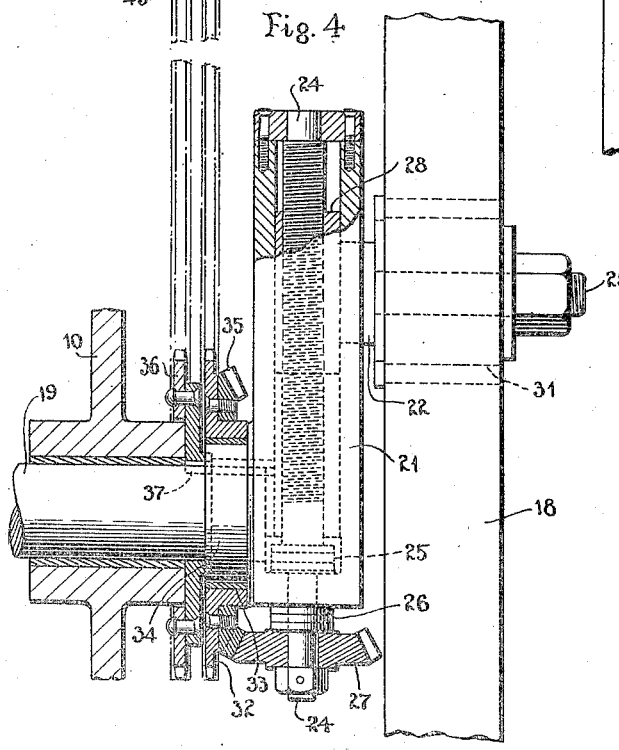

Patented June 10, 1930

1,763,583

UNITED STATES PATENT OFFICE

JORGEN I. HAASE, OF AKRON, OHIO, ASSIGNOR TO THE GOODYEAR TIRE & RUBBER COMPANY, OF AKRON, OHIO, A CORPORATION OF OHIO

CONTROL DEVICE FOR SHEET-FEEDING MECHANISMS

Application filed March 23, 1928. Serial No. 264,253.

This invention relates to control devices for feeding mechanisms and it has particular relation to a device of the above designated character which shall be especially applicable for controlling the intermittent feeding of tire tread stock in a tread stock cutting machine.

Many forms of mechanisms have been employed for varying the rate of feeding stock to cutting machines. Many of these mechanisms require that the machine be stopped to permit adjustment, while others are complicated in construction, and, consequently, are easily thrown out of proper working condition. The herein described device has been particularly designed to effect simplicity of construction and efficiency of operation in a control for stock feeding mechanisms which functions without affecting the operation of the remainder of the machine.

One object of the invention is to provide a device for varying the intermittent feeding of tread stock in a tire tread cutting machine while the machine is in continuous operation.

A more specific object of the invention is to provide means for varying the effective length of a crank carried by a continuously rotating shaft to vary the speed and distance of travel of a gear segment driven by the crank.

For a better understanding of the invention, reference may now be had to the accompanying drawings, forming a part of the disclosure, in which;

Figure 1 is a fragmentary side elevational view of a portion of a tire tread cutting machine embodying the features of this invention, parts being broken away better to illustrate the association and construction of hidden elements;

Figure 2 is a front elevational view thereof;

Figure 3 is a view, partially in elevation and partially in cross-section, on a larger scale, of a portion of the control device; and Figure 4 is a similar view of another portion of the control device.

Although the invention is capable of general application to various forms of stock feeding apparatus, it is shown, for illustrative purposes only, in the accompanying drawings as embodied in a machine for cutting tire tread stock into various predetermined lengths. Only those portions of the machine which are necessary to a complete disclosure of the control device are shown in the drawings.

The machine includes a frame 10 and a plurality of rollers 11 for intermittently feeding tread stock to a cutting device (not shown). It is essential that the stock remain stationary during the periodic cutting operations. Therefore the driving mechanism for the rollers 11 includes a one way clutch 12 which is alternately rotated in opposite directions and imparts a unidirectional intermittent movement through conventional driving means to the rollers 11. A gear 13 mounted on a shaft 14 of the clutch 12 meshes with a gear 15 on a shaft 16 which has keyed thereto a gear 17 that meshes with and is driven by a gear segment 18.

The feeding mechanism is driven, primarily, by a shaft 19 which is continuously rotated during the operation of the machine. One end of the shaft 19 has rigidly secured thereto a radially extending crank arm 21, which adjustably carries a driving element 22 that travels in a slot 23 provided centrally of the gear segment 18 to cause oscillation of the latter as the shaft rotates.

As best shown in Figure 4, a screw-threaded rod 24, rotatably carried within the crank arm 21 and supported upon bearings 25 and 26, has a beveled gear 27 keyed to the lower end thereof. The driving element 22 includes an elongated head 28 screw-threaded upon the rod 24 and slidable within the arm 21 and a shank 29 which carries a block or bushing 31 that slidably fits within the slot 23.

A sprocket wheel 32, having an interior bushing 33, is rotatably mounted upon a projection 34 of the crank 21 and carries a bevel gear 35 which meshes with the bevel gear 27. A sprocket wheel 36, equal in size to the wheel 32, is keyed, as indicated at 37, to the shaft 19 to rotate therewith.

An auxiliary shaft 38 is rotatably supported in parallel alignment with the axis of the shaft 19 by means of a bearing 39 carried by the frame and an anti-friction bearing device 41 carried by a bracket 42. A sprocket wheel 43 keyed, as indicated at 44, to the auxiliary shaft 38 is driven by means of a chain 45 trained about the sprocket wheel 36 carried by the shaft 19. A sleeve 46 is rotatably mounted in concentric relation to the shaft 38 by means of ball bearings 47.

A hand wheel 48 is keyed to the sleeve 46 and a head 49 is secured upon an end of the shaft 38 by means of a set screw 51. The head 49 carries a spring pressed pin 52 which is normally urged in one direction by a spring 53, but may be withdrawn manually in opposition to the force of the spring by means of a knob 54 thereon. The pin 52 is designed operatively to connect the head 49 to the hand wheel 48 by its engagement in any one of a series of apertures 55 provided in the hand wheel.

A sprocket wheel 50, equal in diameter to the wheel 43, is keyed to the sleeve 46 and is operatively connected by means of a chain 56 to the sprocket wheel 32 loosely mounted on the shaft 19.

From the foregoing description it will be apparent that continuous rotation of the shaft 19 causes rotation of the arm 21 about the axis of the shaft which movement, through the agency of the driving element 22 within the slot 23, causes an oscillatory movement of the gear segment 18 to transmit intermittent movement to the rolls 11. The shaft 38 is caused to rotate continuously by means of the sprocket wheels 36 and 43 and the chain 45. When the pin 52 is engaged within one of the apertures 55 the sleeve 46 is caused to rotate and drives the gear 35 through the agency of sprocket wheels 32 and 50 and the chain 56.

This rotation of the gear 35 is just sufficient to prevent rotation of the gear 27, with respect to the rod 24, as it is carried about the axis of the shaft 19 by the movement of the arm 21. If, however, the pin 52 is disengaged from the hand wheel 48, movement of the gear 35 is stopped which causes rotation of the gear 27 and the rod 24, thereby varying the position of the driving element 22 with respect to the axis of the shaft 19.

If, while the head 49 and hand wheel 48 are disengaged, the hand wheel is rotated in the proper direction by means of its handle 57, the gear 35 is caused to rotate in an opposite direction to the rotation of the sprocket wheel 36, which causes adjustment of the driving member 22 in the opposite direction. Thus, without stopping the machine the effective length of the crank arm 21 may be increased or decreased through the agency of the control mechanism.

Although I have illustrated only one form which the invention may assume and have described in detail only a single application thereof, it will be apparent to those skilled in the art that the invention is not so limited, but that various minor modifications may be made therein without departing from the spirit of the invention or from the scope of the appended claims.

What I claim is:

1. In combination, a driving shaft, a crank arm extending therefrom, a threaded rod mounted for rotation within the arm, a bolt threaded on the rod and slidable with respect to the arm, a beveled gear keyed to the rod, a sprocket wheel loosely mounted on the shaft, a beveled gear secured to the sprocket wheel and meshing with the gear on the rod, an auxiliary shaft rotatably mounted a distance from the driving shaft, sprocket wheels keyed to the two shafts, a sleeve rotatably mounted in concentric relation to the auxiliary shaft, a sprocket wheel keyed to the sleeve, a driving element trained about the sprocket wheels keyed to the respective shafts, a driving element trained about the loosely mounted sprocket and the sprocket on the sleeve, and means for selectively connecting and disconnecting the sleeve and the auxiliary shaft.

2. In combination, a driving shaft, a crank arm extending radially from an end thereof, a threaded rod mounted for rotation within the arm, a bolt threaded on the rod and slidable with respect to the arm, a beveled gear keyed to the rod, a sprocket wheel loosely mounted on the shaft, a beveled gear secured to the sprocket wheel and meshing with the gear on the rod, an auxiliary shaft rotatably mounted a distance from the driving shaft, sprocket wheels keyed to the two shafts, a sleeve rotatably mounted in concentric relation to the auxiliary shafts, a sprocket wheel keyed to the sleeve, a driving element trained about the sprocket wheels keyed to the respective shafts, a driven element trained about the loosely mounted sprocket and the sprocket on the sleeve, a hand wheel on the sleeve, a head on the auxiliary shaft and means for connecting the head to the wheel in adjusted positions to rotate therewith.

3. In combination, a driving shaft, a crank arm extending from an end thereof, a rod rotatably carried by the arm, a driving element threaded on the rod, an auxiliary shaft rotatably supported a distance from the driving shaft, beams for driving the auxiliary shaft from the driving shaft, a sleeve rotatably mounted on the auxiliary shaft, means for operatively connecting and disconnecting the auxiliary shaft and sleeve, a beveled gear keyed to the rod, and means for driving the gear on the rod from the sleeve.

4. In combination, a driving shaft, a crank arm extending from an end thereof, a rod rotatably carried by the arm, a driving element threaded on the rod, an auxiliary shaft rotatably supported a distance from the driving shaft, means for driving the auxiliary shaft from the driving shaft, a sleeve rotatably mounted on the auxiliary shaft, means for operatively connecting and disconnecting the auxiliary shaft and sleeve, a beveled gear keyed to the rod, a beveled gear loosely mounted on the driving shaft and meshing with the gear on the rod and means for driving the loosely mounted gear from the sleeve.

5. In combination, a driving shaft, a crank arm extending from an end thereof, a rod rotatably carried by the arm, a driving element threaded on the rod, a gear segment mounted for oscillation adjacent the arm and formed with a slot for reception of the driving element, an auxiliary shaft rotatably supported a distance from the driving shaft, means for driving the auxiliary shaft from the driving shaft, a sleeve rotatably mounted on the auxiliary shaft, means for operatively connecting and disconnecting the auxiliary shaft and sleeve, a beveled gear keyed to the rod, and means for driving the gear on the rod from the sleeve.

6. In combination, a driving shaft, a crank arm extending from an end thereof, a rod rotatably carried by the arm, a driving element threaded on the rod, a gear segment mounted for oscillation adjacent the arm and formed with a slot for reception of the driving element, an auxiliary shaft rotatably supported a distance from the driving shaft, means for driving the auxiliary shaft from the driving shaft, a sleeve rotatably mounted on the auxiliary shaft, means for operatively connecting and disconnecting the auxiliary shaft and sleeve, a beveled gear keyed to the rod, a beveled gear loosely mounted on the driving shaft and meshing with the gear on the rod and means for driving the loosely mounted gear from the sleeve.

7. In a machine for feeding strip material, a feeding roller, a rotatable member associated with the feeding roller, means connecting the roller and the rotatable member to permit independent rotation between the roller and the rotatable member when the latter is driven in one direction and providing a driving connection therebetween when the member is rotated in the opposite direction, a pivoted arm associated with the rotatable member, a driving connection between the pivoted arm and the rotatable member, a crank arm mounted for rotation in a plane parallel to the plane of oscillation of the pivoted arm, a wrist pin secured to the crank arm, a sliding connection between the wrist pin and the pivoted arm, and means associated with the crank arm and operating through the center of rotation thereof for adjusting the wrist pin in a radial direction while the arm is rotated.

8. In a machine for feeding strip material, a roller, a rotatable gear associated with the roller, clutch mechanism disposed between the roller and the gear and permitting independent rotation when the gear is driven in one direction and providing a driving connection therebetween when the gear is rotated in the opposite direction, a segmental gear mounted for oscillation adjacent the gear, a driving connection between the segmental gear and the rotatable gear, a crank arm journaled adjacent the segmental gear, a crank pin secured to the crank arm and having a slidable connection with the segmental gear, and means operating through the journal of the crank arm for extending or retracting the crank pin in a radial direction along the crank arm.

9. In combination, a driving shaft, a bearing therefor, a crank arm rigidly mounted upon the shaft, a screw longitudinally mounted within the crank arm, a crank pin threadably mounted upon the screw, a gear rigidly mounted upon the screw, a second gear rotatably mounted upon the shaft between the crank arm and the bearing, and meshing with the first gear, and manually controlled means for rotating the second gear with respect to the shaft.

10. In combination, a driving shaft, a bearing therefor, a crank arm rigidly mounted upon the shaft, a screw longitudinally mounted within the crank arm, a crank pin threadably mounted upon the screw, a gear rigidly mounted upon the screw, a second gear rotatably mounted upon the shaft between the crank arm and the bearing and meshing with the first gear, and manually controlled means for rotating the second gear with respect to the shaft, and means for positively preventing rotation of the shaft.

11. In combination, a driving shaft, a bearing therefor, a crank arm rigidly mounted upon the shaft, a screw longitudinally mounted within the crank arm, a crank pin threadably mounted upon the screw, a gear rigidly mounted upon the screw, a second gear rotatably mounted upon the shaft between the crank arm and the bearing and meshing with the first mentioned gear, and manually controlled means for rotating the second gear with respect to the shaft, said means comprising a sprocket chain trained about the second mentioned gear.

12. In combination, a supporting shaft, a bearing for the shaft, a crank arm rigidly secured upon the shaft, a screw mounted for rotation without longitudinal movement within the crank, a crank pin threaded upon the screw, a gear rigidly mounted upon the screw, a second gear rotatably mounted upon the supporting shaft and meshing with the first mentioned gear, a third gear rigidly mounted upon the shaft, both the second and third gears being located between the crank arm and the bearing, and means interconnecting the latter gears for selectively rotating them as a unit or for rotating the gears independently of each other.

13. In combination, a supporting shaft, a bearing for the shaft, a crank arm rigidly secured upon the shaft, a screw mounted for rotation without longitudinal movement within the crank, a crank pin threaded upon the screw, a gear rigidly mounted upon the screw, a second gear rotatably mounted upon the supporting shaft and meshing with the first mentioned gear, a third gear rigidly mounted upon the shaft, both the second and third gears being located between the crank arm and the bearing, and means interconnecting the latter gears for selectively rotating them as a unit or for rotating the gears independently of each other, said means comprising a pair of gears mounted upon an auxiliary shaft and having driving connections with the gear upon the supporting shaft, and manually controlled means for selectively interlocking the pair of gears or for releasing them for independent rotation.

14. In combination, a rotatable shaft, a crank arm mounted upon the shaft, a crank pin supporting the screw rotatably mounted in the arm, a gear rigidly connected to the screw, a second gear engaging the first gear and rotatable independently but coaxially with respect to the shaft, a third gear rigidly secured to and in coaxial alignment with the second gear, a fourth gear rigidly mounted upon the shaft, fifth and sixth gears mounted in coaxial alignment for independent rotation upon a second shaft parallel to the first shaft, a clutch for selectively engaging and disengaging the last mentioned gears, said last two gears being respectively operatively connected to the third and fourth gears.

15. In combination, a rotatable shaft, a gear rigidly mounted thereon, a second gear mounted for independent rotation in coaxial alignment with respect to the shaft, a second pair of gears mounted for rotation about an axis disposed in spaced parallel relation with respect to the axis of the shaft, means for selectively connecting and disconnecting the latter gears for rotation as a unit, or for permitting independent rotation, said gears having driving connections with the first mentioned pair of gears.

In witness whereof, I have hereunto signed my name.

Signed at Akron, in the county of Summit and State of Ohio, U. S. A., this 22nd day of March, 1928.

JORGEN I. HAASE.